United States Patent [19]

Caines et al.

[11] Patent Number: 5,556,923
[45] Date of Patent: Sep. 17, 1996

[54] CONTINUOUS PROCESS FOR PRODUCING ADDUCTED EPM OR EPDM OIL SOLUTION

[75] Inventors: Tony L. Caines; Michael L. Junker, both of Baton Rouge, La.

[73] Assignee: DSM Copolymer, Inc., Baton Rouge, La.

[21] Appl. No.: 518,075

[22] Filed: Aug. 22, 1995

Related U.S. Application Data

[60] Continuation of Ser. No. 319,310, Oct. 6, 1994, Pat. No. 5,516,849, which is a division of Ser. No. 42,866, Apr. 5, 1993, Pat. No. 5,384,371, which is a continuation of Ser. No. 949,336, Sep. 22, 1992, abandoned, which is a continuation of Ser. No. 484,378, Feb. 23, 1990, abandoned.

[51] Int. Cl.$^6$ .................. C08F 255/04; C08F 255/06; C10M 145/16

[52] U.S. Cl. ............. 525/285; 525/301; 525/309; 525/310; 508/233; 508/234

[58] Field of Search .................. 525/285, 301, 525/309, 310; 252/51.5 A

[56] References Cited

U.S. PATENT DOCUMENTS 4,749,505  6/1988  Chung ................ 252/51.5 A

*Primary Examiner*—Vasu S. Jagannathan
*Attorney, Agent, or Firm*—Rockey, Rifkin and Ryther

[57] ABSTRACT

The present invention provides a continuous process for producing an adducted derivatized EPM or EPDM oil solution, in which a grafted ethylene polymer is adducted with an antioxidant diamine for formation of an adduct during holding.

11 Claims, 2 Drawing Sheets

CONTINUOUS PROCESS FOR PRODUCING ADDUCTED EPM OR EPDM OIL SOLUTION

This is a continuation of U.S. patent application Ser. No. 08/319,310 filed on Oct. 6, 1994, now U.S. Pat. No. 5,516,849 which is a divisional of U.S. patent application Ser. No. 08/042,866 filed Apr. 5, 1993 which issued as U.S. Pat. No. 5,384,371 which is a continuation of U.S. patent application Ser. No. 07/949,336 filed Sep. 22, 1992, now abandoned, which is a continuation of U.S. patent application Ser. No. 07/484,378 filed Feb. 23, 1990, now abandoned.

The present invention relates to a continuous process for the production of adducted, or capped, derivatized ethylene-propylene copolymer or terpolymer (EPM or EPDM) oil solution.

Engine motor lubricant formulations are conventionally based upon dilute solutions of synthetic elastomers in oil. The addition of low molecular weight polymer constituents to the oil provides an improvement in the viscosity index (VI) over the oil itself, such that the desired lubricant viscosity is achieved and maintained over the operating temperature range of the motor.

Polymeric viscosity index improvers for lubricants are known in the art. For instance, U.S. Pat. No. 4,161,452 describes the grafting in solution of diacid or anhydride functional monomers to ethylene copolymers with recovery of the grafted product in solid form, to provide a viscosity index improver. According to that patent, the grafted batch product may then be incorporated into an oil system to provide the desired VI improvement.

U.S. Pat. No. 4,357,250 discloses the use in lubricants, as a dispersant and viscosity modifier, of derivatized ethylene copolymers prepared by Ene reactions.

The reaction product of maleic anhydride with a saturated ethylene-propylene rubber of low molecular weight has been employed to produce a low molecular weight oil viscosity index improver, according to U.S. Pat. No. 4,670,515.

The continuous grafting of ethylene copolymers and terpolymers in solution with monomers to produce an oil solution including a dispersant olefin copolymer that also functions as a viscosity index improver is taught in U.S. Pat. No. 4,340,689.

None of the foregoing patents, however, describes a continuous process for producing an adducted derivatized ethylene-propylene copolymer or terpolymer oil solution. A continuous process results in lower production costs over batch processes for producing similar products, and further provides a more consistent product over time. In addition, a continuous process is more energy efficient than alternative processes. It also has the environmental advantage of generating no waste streams, since raw materials and intermediate species are either recovered or incorporated into the end product.

Moreover, an adducted product is particularly desirable for providing long term stabilization of the oil solution, in that oxidation of the oil solution is reduced or eliminated by the presence of an adducted species having antioxidant properties.

SUMMARY OF THE INVENTION

The present invention provides a continuous process having the foregoing advantageous characteristics. According to the present invention, a continuous process for producing an adducted derivatized EPM or EPDM oil solution is provided, comprising the continuous sequence of interpolymerizing in solution monomers of ethylene and an olefinic hydrocarbon having from 3 to 16 carbon atoms, and in some cases a polyene monomer, to produce a polymer product, concentrating the polymer product in the solution, grafting the polymer with a grafting monomer selected from the group consisting of an organic acid or anhydride, preparing an oil solution of the grafted reaction products, mixing the oil solution with an antioxidant polyamine composition in the presence of an aliphatic or phenolic alcohol ethoxylate solvent, and holding the mixture for a sufficient time and at a temperature sufficient to permit the formation of an imide adduct between the grafted polymer and the polyamine.

The invention is further directed to the adducted product formed by this process.

Thus it is an object of the present invention to provide a continuous process for producing a stable EPM or EPDM oil solution having the advantage of lower production costs associated with the continuous process.

Another object of the invention is to provide such a process wherein no waste streams are generated by the process, thereby producing no deleterious environmental effects.

Still another object of the invention is to provide such a process whereby lower energy costs associated with the process are produced.

Yet another object of the invention is to produce such a product wherein the formation of the adduct produces an oxidation resistant oil solution stable over reasonably long durations.

A further object of the invention is to provide such a product wherein the adduct formation results in both dispersant and antioxidant properties.

These and other objects and advantages of the present invention will become apparent from the detailed description of the invention provided below.

DETAILED DESCRIPTION OF THE INVENTION

Figure 1:
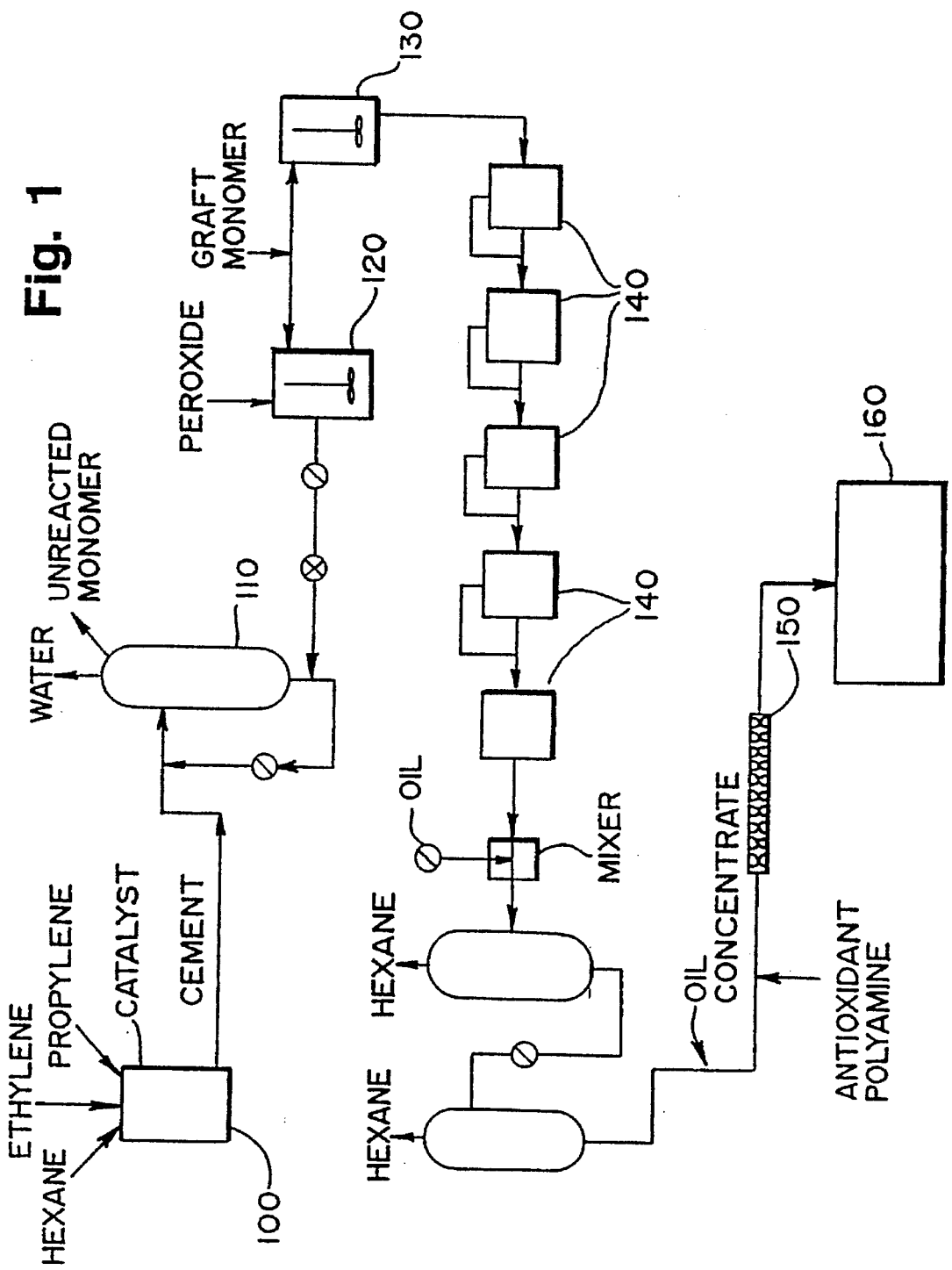
FIG. 1 is a process flow diagram illustrating graphically the steps of the process of the present invention.

The continuous process of the present invention incorporates a number of steps including the formation of the derivatized EPM or EPDM along with the steps producing the adducted EPM or EPDM oil solution, as shown in FIG. 1. As disclosed in U.S. Pat. 4,340,689 ("the '689 patent"), incorporated by reference herein, the continuous grafting of ethylene copolymers in solution with monomers to produce an oil solution including a dispersant olefin copolymer that also functions as a viscosity index improver. The preferred EPM copolymer is produced by interpolymerization in solution of monomers of ethylene and one or more higher monoolefins having from 3 to 16 carbon atoms, preferably propylene. The reaction is carried out in solution in the presence of a Ziegler catalyst, e.g., a vanadium compound activated by an alkyl aluminum chloride.

If EPDM is to be produced, one or more polyenes are also added to the interpolymerization reaction mixture described above. Suitable polyene monomers may be selected from branched chain monomers, straight or branched chain polyene or cyclic polyenes containing 4 to 20 carbon atoms and preferably 5 to 10 carbon atoms and two carbon-carbon double bonds. Useful polyenes include the alkylidene norbornenes, and specifically 2-ethylidene-5-norbornene.

The EPM or EPDM polymerization is carried out on a continuous basis in an agitated first reaction vessel 100 into which monomer, catalyst and polymerization accelerators have been continuously supplied, and from which reaction products are continuously withdrawn. A cement of the polymerized reaction products is then prepared by concentrating the reaction products in a second vessel 110. Such concentration is desirable for increasing efficiency of a subsequent grafting reaction, and for reducing the likelihood of producing unwanted byproducts during the grafting reaction.

The cement thus produced is advanced to a mixer or mixers 120, 130 where it is mixed with a grafting monomer and a peroxide catalyst to achieve a desired grafting reaction. The peroxide catalyst is one having a half life ($T_{1/2}$) of 10–20 minutes at the reaction vessel temperature of 250°–350° F., and is preferably one having $T_{1/2}$ of 12–17 minutes at 300°–325° F. Examples of such catalysts include DICUP® (Hercules, Inc.), which is dicumyl peroxide, and VAROX® (R. T. Vanderbilt Co.), which is 2,5-dimethyl-2,5-di(tertbutyl peroxy) hexane.

The resulting mixture is then passed from the first reaction vessel to a third reaction vessel 140, which may preferably be a plurality of reactors connected in series for continuous operation as shown in FIG. 1. After reaction, solvent is removed according to steps set forth in the '689 patent, and the oil solution is made.

With respect to the present invention, the process of the '689 patent is used to graft an organic acid or anhydride to the EPM copolymer having the generalized structure

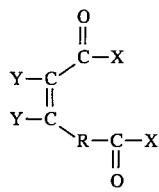

in which R is an alkylene group having 0–4 carbon atoms; Y is hydrogen or a branched or straight chain alkyl group, a halogen group such as chlorine, bromine or iodine, or a heterocyclic or other organic group having 1–12 carbon atoms; and X is a hydroxy, alkoxy or aryloxy group, but at least one X group is hydroxy. The structure is such as to permit formation of an imide upon reaction with the amine composition described below. For EPM, the grafted group is preferably maleic anhydride.

The amount of graft will vary depending upon the particular characteristics desired in the final product. In the preferred embodiment, an amount of 0.5–1.5 weight percent maleic anhydride in the grafted EPM is employed. The oil solution production process described above and disclosed in the '689 patent is adjusted to produce an effluent end stream composed of between 10 and 20 percent by weight grafted EPM and about 80–90 weight percent paraffinic oil.

In the present invention, a second stream is added to this end stream, consisting of an antioxidant polyamine composition, R-(NH$_2$)$_n$, in which n is at least two, in organic solution. Effective compositions for the amine are such that a first, or primary, amine group is separated from a secondary amine group (or tertiary amine group, if more than two amine groups are provided) by at least three or more carbon atoms. Two effective antioxidant polyamine groups are N,N-dimethyl, 1,3-diaminopropane and N-phenyl, 1,4-phenylene diamine (NPPDA), the latter of which is preferred. The amine composition is provided in stoichiometric quantities based upon the amount of grafted monomer present in the EPM or EPDM oil solution, so that the grafted functionality is completely adducted by the amine and the organic solvent. In the preferred embodiment, this ratio will be 0.6–1.2 amine-containing molecules per grafted anhydride group.

The organic solvent employed is selected to be compatible with the compositions in the first stream and consists of the family of aliphatic or phenolic alcohol ethoxylates as shown by the structure below:

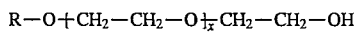

wherein x is a number from 1–10, and R is either an aliphatic group having from 7 to 20 carbons or an aryl group such as phenyl and substituted derivatives thereof, the substitution being an alkyl group having from three to 20 carbons. Useful examples include SURFONIC® N-40 or N-60 (Texaco, Inc.), which are the reaction products of nonyl phenol with ethylene oxide, and SURFONIC® L46-7, which is the reaction product of C$_{12}$–C$_{18}$ aliphatic alcohols with ethylene oxide. Other organic solvents useful in the practice of this invention include the reaction products of other alkyl phenols and or C$_7$–C$_{20}$ aliphatic alcohols with ethylene oxide.

The first and second streams are fed together into a mixer 150, e.g., a static mixer, of sufficient size and mixing capacity to permit complete mixing of the two streams. Thorough mixing permits formation of an adduct between the amine functional group and the anhydride. Thus, the adduct formed is an imide:

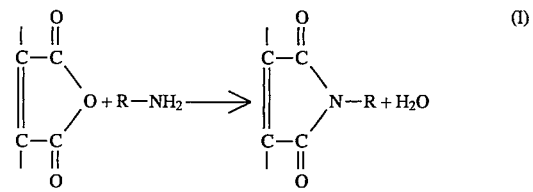

or an acid amide:

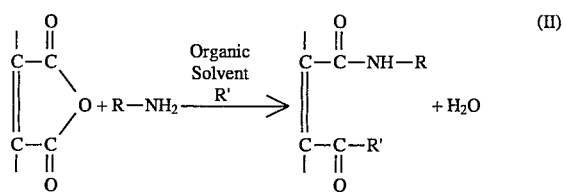

in which the reactant R-NH$_2$ as shown is the antioxidant polyamine composition described above.

It is also hypothesized that, in the first stream, there will be present small quantities of maleic anhydride oligomer formed from excess maleic anhydride monomer during the grafting reaction. This species is also adducted according to reaction (III), with the resulting product believed to contribute to the chelating/dispersant performance of the oil solution.

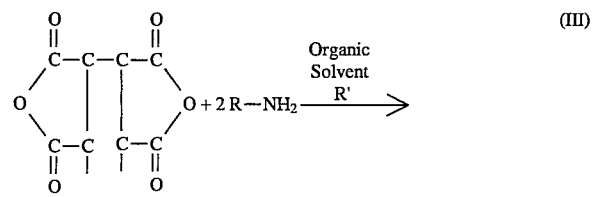

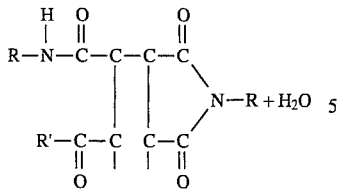

The resultant adducted mixture is advanced to a holding tank 160, where it is preferably held at adduct forming temperatures to drive reaction (I) and maintain the presence of adduct imide in the solution. Such temperatures are in the range of 120°–350° F., with the range of 300°–350° F. being preferred.

It has also been determined that a greater capping efficiency results when the capping reaction occurs under a nitrogen atmosphere, rather than a vacuum. Thus, the mixed product is preferably held under a-nitrogen atmosphere to provide increased capping efficiency.

Figure 2:
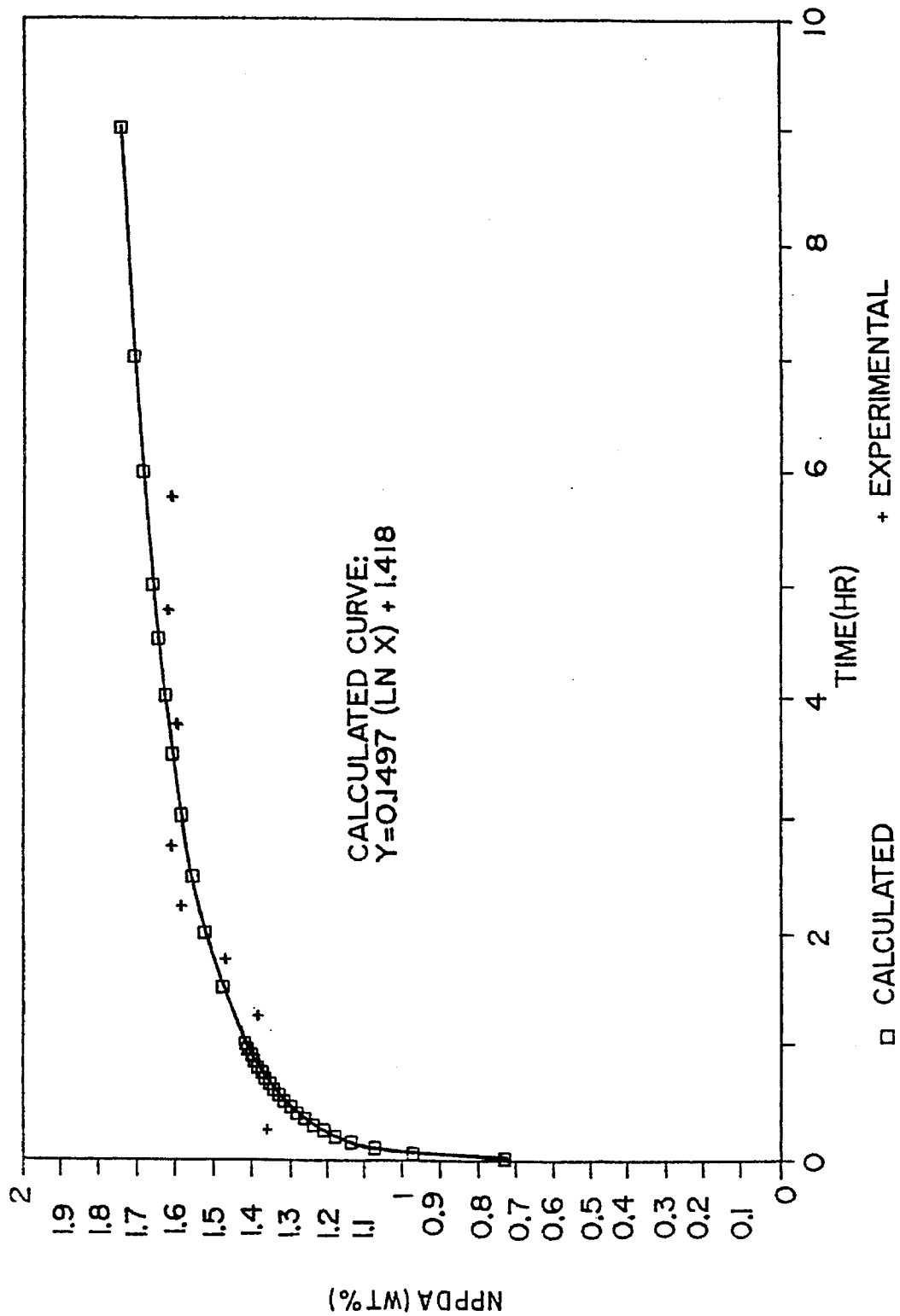
FIG. 2 is a graph showing the variation in weight percent of stored polyamine over time during holding of the adducted EPM or EPDM oil solution made according to the present invention.

It has been observed that holding the adducted mixture at the adduct forming reaction temperature results in an increasing amount of adducted EPM or EPDM. This is shown by the data set forth in Table I. FIG. 2 is a theoretical graph showing the variation in weight percent of stored polyamine (NPPDA) over time during holding of the adducted EPM or EPDM oil solution made according to the present invention. Table II shows similar data for several different samples of adducted derivatized EPM or EPDM.

TABLE I

| HOLDING TIME (hr) | NPPDA (wt %)[1] |
|---|---|
| 0.25 | 1.36 |
| 0.75 | 1.39 |
| 1.25 | 1.39 |
| 1.75 | 1.47 |
| 2.25 | 1.58 |
| 2.75 | 1.61 |
| 3.75 | 1.60 |
| 4.75 | 1.62 |
| 5.75 | 1.61 |

[1]Theoretical Maximum = 1.73 wt %.

TABLE II

| Total Target NPPDA (wt %) | | Analyzed NPPDA (wt %) Reaction Time (hours) | | | | |
|---|---|---|---|---|---|---|
| | | 3 | 6 | 24 | 72 | Final |
| 6.8 | Bound | 1.31 | — | 1.92 | 2.11 | — |
| | Total | 8.74 | — | 9.54 | 9.39 | — |
| 6.8 | Bound | 1.63 | 1.73 | 1.82 | 1.95 | — |
| | Total | 6.67 | 7.03 | 7.67 | 7.85 | — |
| 4.5 | Bound | 1.35 | 1.39 | 1.65 | 1.59 | — |
| | Total | 4.45 | 4.52 | 4.55 | 4.60 | — |
| 4.5 | Bound | 1.17 | 1.27 | 1.39 | 1.49 | 1.48 |
| | Total | 4.59 | 4.49 | 4.47 | 4.23 | 4.56 |
| 4.5 | Bound | 1.11 | 1.26 | 1.36 | 1.63 | 1.50 |
| | Total | 3.64 | 3.99 | 4.28 | 4.18 | 4.40 |
| 4.5 | Bound | 1.23 | 1.28 | 1.44 | 1.60 | 1.55 |
| | Total | 4.97 | 5.05 | 5.12 | 5.05 | 5.02 |

The advantages of the continuous capping process of the present invention as applied in a continuous graft cement production system, as compared to a batch capping process, are shown in Table III, which includes comparative data for batch capped oil solution and continuously capped oil solution. In the batch capping process, the cement, oil and amine solution are combined in a sealed vessel, and the hexane stripped off with stirring by raising the temperature of the mixture to about 370° F. under a vacuum.

The data shown in Table III illustrates the superiority of products produced according to the present invention, in which the cement is produced continuously and capped continuously, as compared to products wherein either the cement production or the capping process is a batch process, or both.

TABLE III

| Graft Cement Type | Capping Process Type | NPPDA/ Total MAH Ratio (molar) | Bound NPPDA (wt %) | Engine Test Performance Sequence VE |
|---|---|---|---|---|
| Batch | Batch | 0.43 | 0.47 | Failed |
| Batch | Batch | 0.55 | 1.28 | Good |
| Batch | Continuous | 0.55 | 1.17 | Excellent |
| Batch | Continuous | 1.0 | 1.60 | Not tested |
| Continuous | Batch | 0.48 | 0.83 | Not tested |
| Continuous | Continuous | 1.1 | 1.95 | Excellent |
| Continuous | Continuous | 0.74 | 1.65 | Excellent |
| Continuous | Continuous | 0.77 | 1.48 | Excellent |

The effects of holding under a nitrogen atmosphere as compared to holding under a vacuum are illustrated by the data shown in Table IV. There, it is shown that substantially higher efficiencies of capping are produced as a result of adduct formation in holding under a nitrogen atmosphere as compared to holding and adduct formation under a vacuum, where the composition is formed according to the present invention.

TABLE IV

| Capping Efficiencies Under Different Atmospheres | | | | | |
|---|---|---|---|---|---|
| Reaction Time (hrs) | Atmo- sphere | Total NPPDA | Bound NPPDA | Theoretical Bound NPPDA | Capping Effic- iency |
| 8 | Nitrogen | 1.67 | 0.74 | 1.24 | 0.60 |
| 17 | Nitrogen | 1.80 | 0.65 | 1.24 | 0.52 |
| 17 | Nitrogen | 2.28 | 1.17 | 1.24 | 0.94 |
| 20 | Nitrogen | 2.89 | 1.32 | 1.24 | 1.06 |
| 18 | Nitrogen | 2.99 | 0.92 | 1.24 | 0.74 |
| 18 | Nitrogen | 2.84 | 0.96 | 1.24 | 0.77 |
| 18 | Nitrogen | 2.27 | 1.16 | 1.24 | 0.94 |
| 8 | Vacuum | 1.66 | 0.60 | 1.24 | 0.48 |
| 8 | Vacuum | 1.80 | 0.71 | 1.35 | 0.53 |
| 8 | Vacuum | 1.47 | 0.51 | 1.20 | 0.43 |

The present invention has been described with respect to certain embodiments and conditions, which are not meant to and should not be construed to limit the invention. Those skilled in the art will understand that variations from the embodiments and conditions described herein may be made without departing from the invention as claimed in the appended claims.

What is claimed is:

1. An adducted EPR or EPDM solution made by a process comprising continuously reacting (a) a grafted polymer prepared by interpolymerizing ethylene with at least one olefinic hydrocarbon containing 3–16 carbon atoms and optionally a polyene or cyclic polyene containing 5–10 carbon atoms which has been grafted with a graft monomer in the form of an unsaturated dicarboxylic acid, acid ester or anhydride, said grafted polymer being dispersed in an oil solution, with (b) an antioxidant polyamine composition in the presence of (c) an aliphatic or phenolic alcohol ethoxylate to form an imide adduct.

2. The solution of claim 1 wherein the grafted monomer used in the process is maleic anhydride.

3. The solution of claim 1 in which the grafted polymer used in the process is an EPM polymer in which the olefinic hydrocarbon is propylene.

4. The solution of claim 1 wherein the ethoxylate used in the process has the structure:

$$R-O+CH_2-CH_2-O+_x CH_2-CH_2-OH$$

wherein x is a number from 1–10 and R is selected from the group consisting of an aliphatic group having from 7–20 carbon atoms and an aryl group or substituted derivative thereof, the substitution being an alkyl group containing 3–20 carbon atoms.

5. An adducted EPM or EPDM solution made by a process comprising the continuous sequence of:
   interpolymerizing in an inert organic solvent ethylene, at least one olefinic hydrocarbon having 3–16 carbon atoms and, optionally, a polyene containing 5–10 carbon atoms to produce a polymer;
   grafting said polymer with a grafting monomer selected from the group consisting of an unsaturated dicarboxylic acid, acid-ester and anhydride to produce a grafted polymer;
   preparing an oil solution of the grafted polymer;
   contacting the oil solution of the grafted polymer with an antioxidant polyamine composition and an aliphatic or phenolic alcohol ethoxylate to react the grafted polymer and form an imide adduct.

6. The solution of claim 5 made by a process which includes the step of exchanging the inert organic solvent with an oil to form the oil solution of the grafted polymer.

7. The solution of claim 5 wherein the polymer produced in the process is an EPM polymer and the olefinic hydrocarbon is propylene.

8. The solution of claim 5 wherein the inert organic solvent used in the process is an aliphatic hydrocarbon solvent.

9. The solution of claim 5 wherein the grafting monomer used in the process is maleic anhydride.

10. The solution of claim 5 wherein the grafting monomer used in the process is present in an amount between 0.5 and 1.5 weight percent of the grafted polymer.

11. The solution of claim 5 wherein the antioxidant polyamine composition used in the process is NPPDA.

* * * * *

UNITED STATES PATENT AND TRADEMARK OFFICE
CERTIFICATE OF CORRECTION

PATENT NO. : 5,556,923
DATED : September 17, 1996
INVENTOR(S) : Tony L. Caines and Michael L. Junker It is certified that error appears in the above-indentified patent and that said Letters Patent is hereby corrected as shown below:

At column 4, after line 40, please delete equation (I) and substitute therefor:

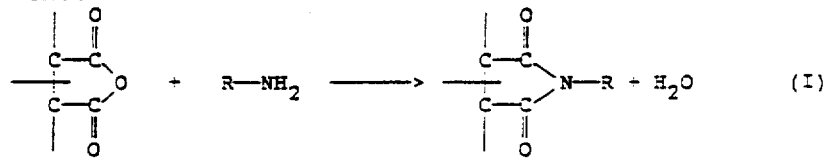

At column 4, after line 50, please delete equation (II) and substitute therefor:

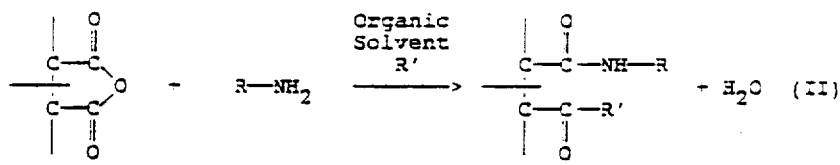

Signed and Sealed this

Twenty-fifth Day of February, 1997

Attest:

BRUCE LEHMAN

Attesting Officer          Commissioner of Patents and Trademarks